US009695915B2

(12) United States Patent
Rodgers, II

(10) Patent No.: US 9,695,915 B2
(45) Date of Patent: Jul. 4, 2017

(54) CONTINUOUSLY VARIABLE PLANETARY TRANSMISSION

(71) Applicant: Allison Transmission, Inc., Indianapolis, IN (US)

(72) Inventor: Dane L Rodgers, II, Avon, IN (US)

(73) Assignee: Allison Transmission, Inc, Indianapolis, IN (US)

( * ) Notice: Subject to any disclaimer, the term of this patent is extended or adjusted under 35 U.S.C. 154(b) by 118 days.

(21) Appl. No.: 14/682,525

(22) Filed: Apr. 9, 2015

(65) Prior Publication Data

US 2016/0298736 A1 Oct. 13, 2016

(51) Int. Cl.
*F16H 13/06* (2006.01)
*F16H 15/52* (2006.01)

(52) U.S. Cl.
CPC ......... *F16H 15/52* (2013.01); *F16H 2200/20* (2013.01)

(58) Field of Classification Search
CPC .............................. F16H 15/52; F16H 2200/20
See application file for complete search history.

(56) References Cited

U.S. PATENT DOCUMENTS

| | | | |
|---|---|---|---|
| 2,469,653 A * | 5/1949 | Kopp | F16H 15/04 476/37 |
| 5,236,403 A * | 8/1993 | Schievelbusch | F16H 15/28 280/236 |
| 6,241,636 B1 | 6/2001 | Miller | |
| 7,198,582 B2 | 4/2007 | Miller et al. | |
| 7,462,123 B2 | 12/2008 | Miller et al. | |
| 8,663,050 B2 | 3/2014 | Nichols et al. | |
| 8,900,085 B2 * | 12/2014 | Pohl | F16H 15/50 475/189 |
| 9,388,884 B2 * | 7/2016 | Hibino | F16H 57/049 |
| 2010/0093480 A1 | 4/2010 | Pohl et al. | |
| 2013/0095977 A1 | 4/2013 | Smithson et al. | |
| 2013/0190125 A1 | 7/2013 | Nichols et al. | |
| 2013/0288848 A1 | 10/2013 | Carter et al. | |
| 2014/0228163 A1 | 8/2014 | Aratsu et al. | |

OTHER PUBLICATIONS

International Search Report & Written Opinion for PCT/US2015/025125; Jan. 4, 2016; Korean Intellectual Property Office; pp. 1-11.

* cited by examiner

*Primary Examiner* — David J Hlavka
(74) *Attorney, Agent, or Firm* — Taft Stettinius & Hollister LLP; Stephen F. Rost

(57) ABSTRACT

A power transfer apparatus and a method of configuring and assembling a power transfer apparatus. The power transfer apparatus includes a continuously variable transmission having a plurality of planets and a plurality of planet spindle assemblies, each one of the plurality of spindle assembly configured to rotatingly support one of the plurality of planets. Each of the spindle assemblies includes a spindle disposed in a channel of one of the plurality of planets. The spindle includes a first end in contact with an input disc and a second end in contact with an output disc. A first and second bearing are respectively located at recesses formed in the spindle. Each of the first bearing and second bearing are in contact with the interior surface of the channel of the planet to provide rotational support thereof. The power transfer apparatus provides improved assembly, performance and reliability.

12 Claims, 5 Drawing Sheets

CONTINUOUSLY VARIABLE PLANETARY TRANSMISSION

FIELD OF THE DISCLOSURE

The present invention relates to a continuously variable transmission and, in particular, to a continuously variable planetary transmission assembly.

BACKGROUND

In a vehicle, a prime mover drives a set of wheels, or other ground engaging traction devices, which engages a support surface, such as a road or ground, to move the vehicle. Because the output of the prime mover, which includes engines and/or motors, must adapt to different speed requirements and road conditions, a transmission is located between the prime mover and a set of wheels to adjust the output of the prime mover in order to move the vehicle at different speeds. The transmission includes an input shaft, operatively connected to an output shaft of the prime mover, and an output shaft, operatively connected to a drivetrain connected to the wheels. Transmissions, however, are not limited to applications involving powered vehicles, but are also used in human propelled vehicles, such as a bicycle, and in industrial machinery used in factories as well as in field operations, for instance at oil drilling operations.

The transmission is a system configured to transmit power and torque from the prime mover to the drive train. In one type of conventional transmission, the transmission includes a variety of gears, shafts, and clutches configured to transmit torque through the transmission at finite, stepped gear ratios. In another type of transmission, a continuously variable transmission (CVT) is configured to continuously vary the ratio of an input rotational speed to an output rotational speed under control of a vehicle operator, typically by a speed controller input such as provided by accelerator.

"On road" vehicles having transmissions include transportation vehicles, such as passenger vehicles and buses, and work vehicles, such as semi-tractors and vehicles used to plow snow, spread salt, or carry refuse. Additionally "off-road" vehicles having transmissions include agricultural vehicles, construction vehicles, such as graders and plows, and lawn maintenance vehicles. Agricultural vehicles can also include a power take off (PTO) driven by the transmission. Likewise, stationary work machines can include transmissions. Such stationary work machines include machines for providing power, such as generators or wind machines, machines used in the oil industry to drill for or to deliver oil, and machines used in the timber industry used to cut or process timber.

In one type of CVT, a plurality of planets is disposed between an input disc and an output disc to vary the ratio of an input speed of the input disc to an output speed of the output disc. Each of the planets is supported for rotation about a central axis, wherein the angle of the central axis is configured to be adjustable to thereby vary the ratio of the input speed to the output speed. The rotary input disc and the rotary output disc are configured to steplessly or continuously vary the ratio of the input speed to the output speed in response to the orientation of the planets. The input disc includes external gear teeth configured to engage the drive shaft or an intermediate shaft coupled to the drive shaft. The output disc includes external gear teeth that are in mesh with and drive shaft or a corresponding gear of the drive train.

Continuously variable transmissions are known to include a large number of components arranged in complex configurations. Because the cost of a CVT can be expensive due to the large number of components, it is desirable to reduce the number of components to reduce the overall cost. In addition, by reducing the number of components, repair costs can be reduced. Likewise, the number of component failures can also be reduced including those resulting from the incorrect assembly of components. What is needed, therefore, is a CVT having an improved manufacturability, improved reliability, and reduced cost.

SUMMARY

In one embodiment of the present disclosure, there is provided a method of assembling a continuously variable planetary gear set having a first stator and a second stator. The method includes: providing a planet having an axially located channel extending through the planet and along the length of a diameter of the planet; providing a spindle having a first and a second recess, a first end, a second end, and a spindle length greater than the length of the channel; providing a first bearing; providing a second bearing; inserting the spindle through the channel; attaching the first bearing to the spindle at the first recess; and attaching the second bearing to the spindle at the second recess.

In another embodiment of the present disclosure, there is provided a method of assembling a continuously variable planetary gear set having a first and a second stator, the method including: providing a spindle having a first and a second recess, a first end, a second end, a central portion located between the first and second end, and a first and second shoulder respectively located between the first end and the central portion and the second end and the central portion; attaching the first bearing to the spindle at the first recess; attaching the second bearing to the spindle at the second recess to provide a spindle assembly having the spindle, the first bearing, and the second bearing; providing a planet having an axially located channel extending through the planet and along the length of a diameter of the planet; and inserting the spindle assembly through the axially located channel.

In still another embodiment of the present invention, there is provided a power transfer assembly including an input shaft and an output shaft, each of which defines a longitudinal axis. The power transfer assembly includes a plurality of planets distributed radially about the longitudinal axis, wherein each of the plurality of planets includes a channel defining a planet axis about which the planet revolves and an interior surface. An input disc assembly is operatively connected to the input shaft and configured to contact each of the plurality of the planets. An output disc assembly is operatively connected to an output shaft and configured to contact each of the plurality of planets. A first stator is disposed between the input disc assembly and the plurality of planets and a second stator is disposed between the output disc assembly and the plurality of planets. A plurality of planet spindle assemblies wherein each one of the plurality of spindle assemblies is disposed in one of the plurality of channels. A first end of the spindle assembly is in contact with the input disc and a second end of the spindle assembly is in contact with the output disc. Each of the plurality of planet spindle assemblies includes a spindle having an exterior surface defining a first and a second recess. A first bearing is disposed at the first recess and a second bearing is disposed at the second recess, wherein each of the first bearing and second bearing are in contact with the interior surface of the channel.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

This disclosure describes a continuously variable transmission with an improved planetary assembly configured to reduce costs and assembly time as well as to reduce or to eliminate defects resulting from improper assembly and component failure. Reliability is also improved.

Figure 1:
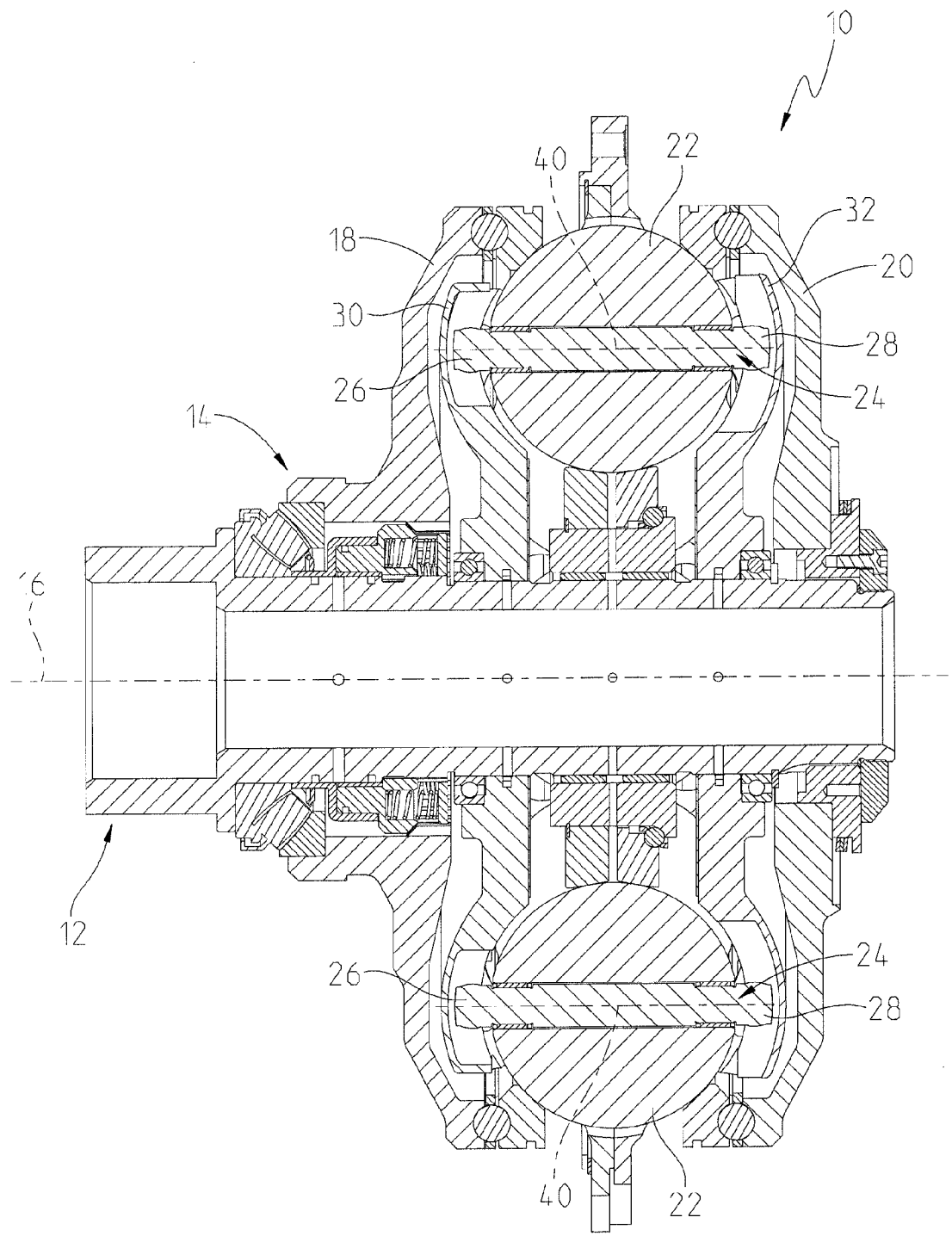
FIG. 1 is a schematic sectional view of a continuously variable planetary (CVP) transmission assembly.

FIG. 1 illustrates an elevational sectional view of a continuously variable planetary (CVP) transmission assembly 10 including an input shaft 12 and an output shaft 14. In one embodiment, the input shaft 12 is operatively connected to a drive shaft of a prime mover (not shown) and an output disc 18 is operatively connected to an input shaft of a drive train (not shown). As can be seen in the illustrated embodiment, the assembly 10 is characterized by its symmetrical configuration about a rotational axis 16. An input disc 20 is operatively connected to the input shaft 12 and is circumferentially located about the axis 16. An input received at the input shaft 12 rotates the input disc 20 about the axis 16. The output disc 18 is circumferentially located about the axis 16. The output disc 18 rotates about the axis 16 in response to rotation of the input disc 20.

The rotational speed of the output disc 18 depends on the rotational speed of the input disc 20 and an axial alignment of a plurality of planets 22, two of which are illustrated. Each of the planets 22 is rotationally supported by a spindle assembly 24 which extends through a central axis of the planet and which is supported respectively at ends 26 and 28 thereof by a movable stator 30 and a fixed stator 32. The stators 30 and 32 are circumferentially located about the axis 16. The assembly 10, in one embodiment, includes eight (8) planets 22 equally spaced about the rotational axis 16. In other embodiments, the number of planets 22 varies. A fluid, such as a traction fluid or traction oil, is delivered to the volume or space defined at each one of the input disc 20 and the output disc 18. The traction fluid lubricates as well as transmits torque to the components located therebetween, as is understood by those skilled in the art.

Each of the spindle assemblies 24 includes a rotational axis 40, the orientation of which is configured to vary with respect to the axis 16 during operation of the assembly 10. By adjusting the orientation or angle of the axis 40 with respect to the axis 16, an output rotational speed generated by the output disc 18 is made to vary with respect to an input rotational speed of the input disc 20. When the axis 40 is substantially parallel to the axis 16, the input rotational speed at the input disc 20 is substantially the same as the output rotational speed of the output disc 18. If, however, the angle of the axis 40 is inclined with respect to the axis 16, the rotational speed of the output disc 18 is less than or greater than the rotational speed of the input disc 20.

Figure 2:
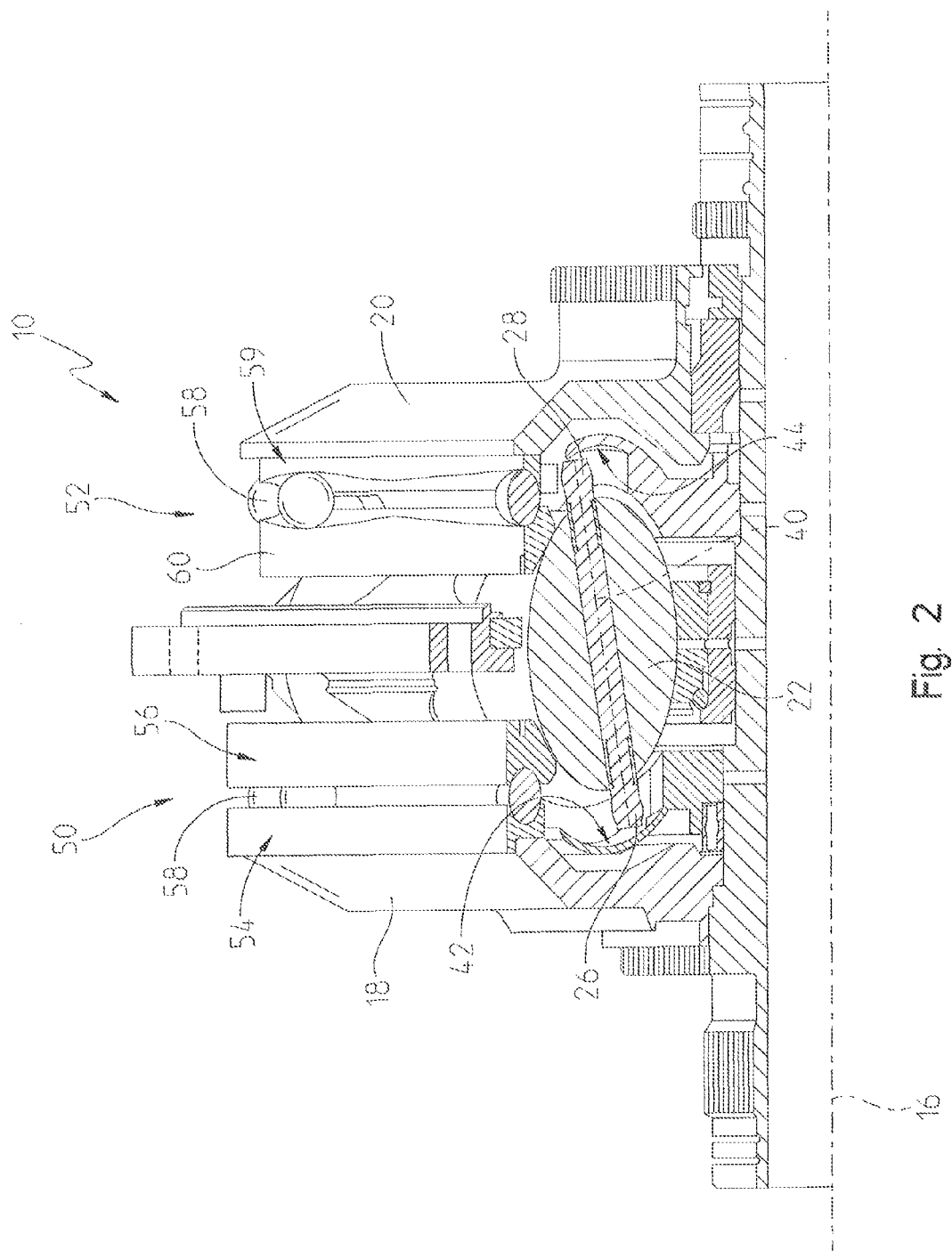
FIG. 2 is a sectional perspective view of a portion of the transmission assembly of FIG. 1.

FIG. 2 is a sectional perspective view of the assembly 10 illustrating an inclined axis 40 with respect to the axis 16. In this view, the end 26 is closer to the axis 16 than the end 28, such that the output disc 18 rotates at a speed greater than the rotational speed of the input disc 20. This figure further illustrates the components of FIG. 1 with additional perspective detail illustrating the first end 26 and the second end 28, each of which is configured to respectively engage a slot 42 in the movable stator 30 and a slot 44 in the fixed stator 32. During operation of the assembly 10, the ends, which are configured to move in the slots, adjust the axis 40 of the spindle assembly 24, thereby adjusting the rotational velocity of the output disc 18 with respect to the input disc 20.

The input disc 20 is operatively connected to the output disc 18 through applied torque delivered by a first traction assembly 52 and a second traction assembly 50. The first traction assembly 52 includes a first helical ramp 59, a first traction ring 60, and a plurality of spheres 58 (balls) which move through a channel defined between the first helical ramp 59 and the traction ring 60. The second traction assembly 50 likewise includes a second helical ramp 54, a second traction ring 56, and the plurality of spheres 58.

In each of the first and second traction assemblies 52 and 50, the helical ramps 59 and 54 are fixedly connected respectively to the input disc 20 and the output disc 18. During operation of the apparatus 10, the balls 58 moving in the channel defined by the helical ramp 59 and the traction ring 60, convert the applied torque of the input disc 20 to an axial force applied by the traction ring 60 to the surface of the planets 22. The planets 22 transfer the applied torque to the output disc 18, since the second traction ring 56 contacts the surface of the planets 22, which is moved into contact with the planets 22 through the camming action of the balls 58 moving in the channel located between the second helical ramp 54 and the second traction ring 56. The torque is consequently transferred to the output disc 18 to thereby rotate the output shaft 14 at a rotational speed determined by the location of the axis 40 of the planets 22 with respect to the axis 16.

Figure 3:
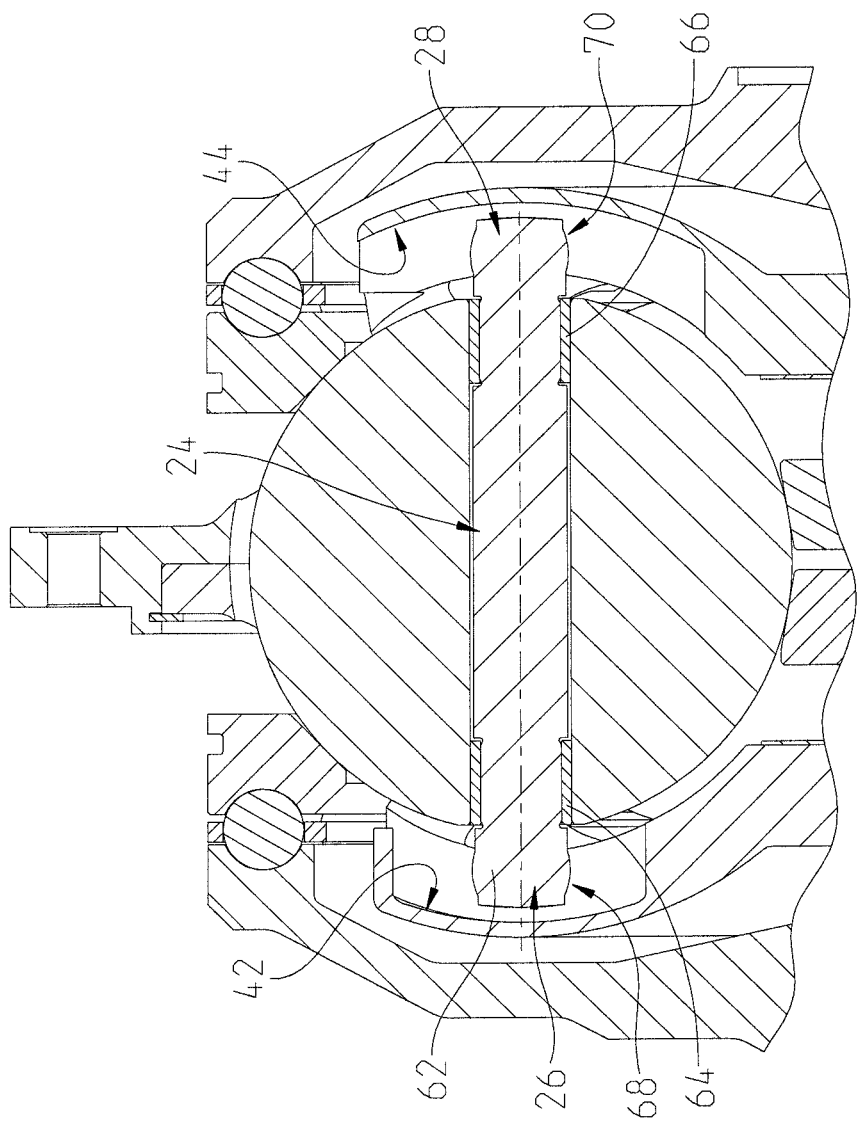
FIG. 3 is a schematic sectional view of a portion of the transmission assembly of FIG. 1.

FIG. 3 is a schematic sectional view of one of the spindle assemblies 24 including a spindle 62, a first bearing 64, and a second bearing 66. The spindle 62 defines the first end 26 and the second end 28 of the spindle assembly 24, each of which respectively engage respective slots 42 and 44. The fluid in the space or chamber located between the input disc 20 and output disc 18 transmits torque as well as lubricates the slots 42 and 44 and ends 26 and 28 to enable movement of the assembly 24 within the slots. The fluid also provides for lubrication between the first and second traction rings 60, 56 and the planets 22 to enable the planet shaft axis to be adjusted. When sufficient force is applied by the traction rings 60 and 56, the fluid provides for a fixed connection between traction rings and the planets to transfer torque from the input disc 20 to the output disc 18.

Figure 4:
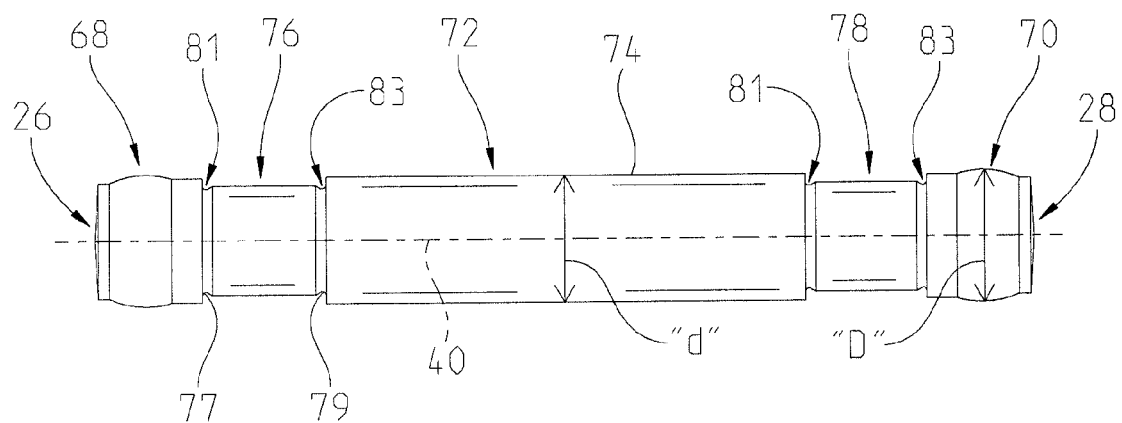
FIG. 4 is an elevational front view of a spindle of the spindle assembly of FIG. 3.
Figure 5:
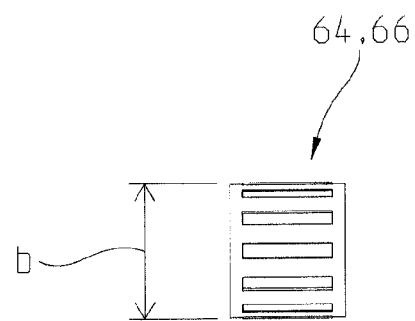
FIG. 5 is an elevational front view of view of a needle bearing cage for a bearing.

As further illustrated in FIGS. 4 and 5, the spindle 62 is generally cylindrical. In one embodiment, the spindle 62 is made of steel and is turned from bar stock having a heat treatment. The spindle 62 extends through the channel of the planet 22, such that such that first end and second end 26 and 28 extend past the outer surface of the planet 22. Located between the outer surface of the planet 22 and ends 26 and 28 is a first spherical feature 68 and a second spherical feature 70. The spindle includes a central portion 72, located between the spherical features 68 and 70, and includes a diameter "d" which is less than a diameter "D" of the spherical features 68 and 70. In one embodiment, the diameter "d" is nineteen millimeters. In other embodiments, the diameter "d" is a different value and the diameter "d" is either equal to or greater than the diameter "D". The spherical features 68 and 70 are configured to carry a load and to transmit the load to the stators. In one embodiment, the spherical features 68 and 70 are provided by grinding a piece of bar stock.

The surface of the spindle 62 includes an exterior surface 74 which defines a first recess 76 and a second recess 78, each of which is configured to provide a location and bearing surface for the first bearing 64 and the second bearing 66. Each of the recesses include a first groove 77 and a second groove 79 located at ends of the recesses which are configured to provide grinder relief to process the first and second recesses 76 and 78. Shoulders 81 and 83, located adjacently to the first groove 77 and second groove 79, are configured to locate and/or retain the bearings 64 and 66 at the bearing surfaces of recesses 76 and 78. By including shoulders 81 and 83, the location of the bearings 64 and 66 are maintained during operation of the assembly 10 without the need for spacers. As seen in FIG. 3, each of the first bearing 64 and the second bearing 66, when located at the recesses 76 and 78 contacts an interior surface of the channel of the spindle 62.

The channels of the planets 22 define a bore or channel through which the spindle assembly 24 is located during manufacture. An interior surface of the bore defines a diameter slightly larger than the diameter "d" of the central portion and slightly larger than the diameter "D" of each of the shoulders. Likewise, the bore inner diameter is slightly larger than an outer diameter "b" of the bearings 64 and 66. In one embodiment, the diameter "b" is 20 millimeters. See FIG. 5. Consequently, assembly of the spindle assembly 24 to the planet 22, in different embodiments, is completed according to one or more processes of assembly.

In one process, the spindle assembly 24 is made as a complete finished assembly including the spindle 62, the bearing 64, and the bearing 66. Once complete, the finished assembly 24 is inserted into the bore of the planet 22. In another process, the spindle 62 is inserted into the bore of the planet 22 and the bearings 64, 66 are added afterwards. In this process, the spindle 62 is slid in the bore to expose either of the recesses at which point each of the bearing 64 and 66 are added in turn. Since the diameters of the bearings, the spindle shoulders, and the spindle central portion are each less than the inner diameter of the planet bore, the spindle assembly 24 is movable within the bore and along the entire length of the bore in either direction, thereby facilitating an ease of assembly and a reduction in assembly time not previously seen.

As illustrated, each of the spindles 62 includes the first shoulder 68 disposed between the first end 26 and the first bearing 64 and the second shoulder 70 is disposed between the second end 28 and the second bearing 66. The outer diameter "b" of the bearings 64 and 66, in one embodiment, is greater than the diameter "d" of the central portion 72, such that the planet 22 is supported at the bearings and not at the central portion 72. In other embodiments, some contact between the central portion 72 and planet may occur, but this contact is lubricated by the fluid located in the CVP.

In one embodiment, each of the bearings 64 and 66 are roller bearings. In one exemplary embodiment, the bearings 62 and 66 are needle roller bearings embodied as a two-piece cage, known as a snap cage, such that the two pieces of each of the roller bearings are snapped together at the recesses 76 and 78 to complete assembly of the bearings about the spindle 62. In still other embodiments, a split cage bearing is used which is expanded during assembly to be placed at the area of the spindle 62 marked "D" which then conforms to the recesses 76 and 78. Other embodiments include the use of roller bearings having ball bearings.

As illustrated and described above, the spindle assembly 24, in one embodiment, consists of three components, the spindle 62, the first bearing 64, and the second bearing 66. Not only is the number of component parts used in the spindle assembly 24 significantly reduced, the amount of time necessary to assemble the apparatus 10 and difficulty in assembling the apparatus 10 are also significantly reduced when compared to the prior art of FIG. 6.

Figure 6:
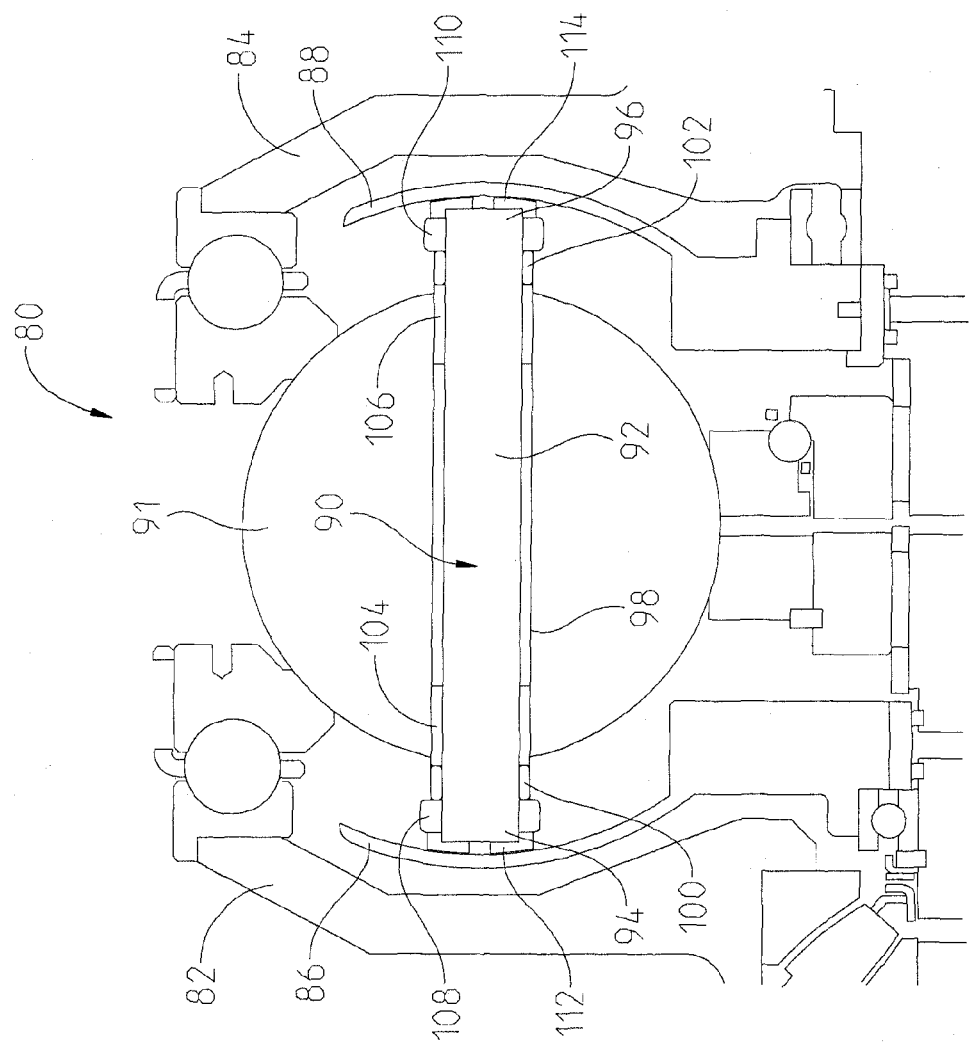
FIG. 6 is a sectional view of a portion of a continuously variable planetary (CVP) transmission assembly of the prior art.

FIG. 6 illustrates one example of a prior art CVP assembly 80 including an input disc 84, an output disc 86, a movable stator 86, and a fixed stator 88. A spindle assembly 90 includes a spindle 92 including a first end 94 engaging a slot of the movable stator 86, and second end 96 engaging a slot of the fixed stator 88. The spindle assembly 90 extends through a bore of a planet 91. In this prior art embodiment, however, the spindle assembly 90 includes ten (10) individual components. The spindle assembly 90 includes the spindle 92 having a cylindrical outer surface which includes a constant diameter from the first end 94 to the second end 96. The spindle assembly 90 further includes three spacers, a middle spacer 98, a first end spacer 100, and a second end spacer 102. A first needle bearing 104 and a second needle bearing 106 are also included. The middle spacer 98 is located at a central region of the spindle 92 and the first needle bearing 104 is located at one end of the middle spacer 98, while the second needle bearing 106 is located at another end of the middle spacer 98. On the opposite sides of the needle bearings and not adjacent to the middle spacer are the first and second end spacers 100 and 102. Each of the spacers 100 and 102 is used to maintain the position of the needle bearings 104 and 106 at locations on the spindle 92 to support the planet 91 for rotation. First and second skew rollers 108 and 110 are located adjacently to the first and second end spacers 100 and 102.

The skew rollers 108 and 110 include a spherical outer diameter and provide a location of contact with the stators. The spherical outer diameter allows for the planet to be positioned at multiple compound angles relative to the stator slots. The spherical outer diameter carries the load and transmits the load to the stator. First and second end caps 112 and 114 complete the assembly and are fixed to the ends of the spindle 92 to hold each of the spacers, needle bearings and skew rollers in place. The end caps 112 and 114 locate the spindle axially and are configured to react to an axial load occurring between the spindle and stator.

Consequently as can be seen, the prior art spindle assembly 90 of FIG. 6 includes ten parts: one spindle; three spacers; two bearings; two skew rollers; and two end caps. The present disclosure, however, includes three parts, a reduction of seven parts. Not only is cost reduced by the presently disclosed apparatus, but assembly of the presently disclosed apparatus is much simpler as well as substantially error free since the bearing 64 and 66 have defined locations, the recesses 76 and 78, at which the bearings are located. Quality control is thereby improved since the present spindle assembly 24 cannot be assembled improperly, unlike the prior art spindle assembly 90 of FIG. 6. Because the spacers, bearing, and skew rollers of the prior art can be located on the spindle 92 in any order, the prior art spindle assembly 90 does not provide error proofing during assembly to dictate the location and the order by which these parts can be slipped onto the spindle. The present spindle assembly 24, however, does provide error proofing which results in not only improved assembly and reliability, but improved performance, as well, since the number of parts which can be damaged or which can fail is reduced.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A power transfer apparatus including an input shaft and an output shaft each of which defines a longitudinal axis, the power transfer apparatus comprising:
   a plurality of planets distributed radially about the longitudinal axis, wherein each of the plurality of planets includes a channel defining a planet axis about which the planet revolves and an interior surface;
   an input disc assembly operatively connected to the input shaft and configured to contact each of the plurality of the planets;
   an output disc assembly operatively connected to an output shaft and configured to contact each of the plurality of planets;
   a first stator disposed between the input disc assembly and the plurality of planets;
   a second stator disposed between the output disc assembly and the plurality of planets; and
   a plurality of planet spindle assemblies, each one of the plurality of spindles disposed in one of the plurality of channels and including a first end in contact with the input disc and a second end in contact with the output disc, wherein each of the plurality of planet spindle assemblies includes a spindle having an exterior surface defining a first and a second recess, a first bearing disposed at the first recess and a second bearing disposed at the second recess, wherein each of the first bearing and second bearing are in contact with the interior surface of the channel.

2. The power transfer apparatus of claim 1 wherein each of the channels defines a
   bore through which the spindle assembly is configured to be adjustably movable along the planet axis such that the first end is movable within the bore and along the entire length of the bore.

3. The power transfer apparatus of claim 2 wherein each of the spindles includes
   a first shoulder disposed between the first end and the first bearing and a second shoulder disposed between the second end and the second bearing.

4. The power transfer apparatus of claim 3 wherein each of the spindles includes a central portion disposed between the first recess and the second recess, wherein the central portion defines a central portion diameter less than a shoulder diameter of one of the first shoulder and the second shoulder.

5. The power transfer apparatus of claim 4 wherein each of the first bearing and the second bearing defines a bearing outside diameter less than the shoulder diameter.

6. The power transfer apparatus of claim 5 wherein the bearing outside diameter is greater than the central portion diameter.

7. The power transfer apparatus of claim 6 wherein each of the central portion diameter, the shoulder diameter and the bearing diameter are less than a bore diameter of the bore.

8. Me power transfer apparatus of claim 7 wherein the first end and the second end each include end diameters less than the shoulder diameter.

9. The power transfer apparatus of claim 8 wherein the first and second bearings include a needle bearing.

10. The power transfer apparatus of claim 9 wherein each of the plurality of planet spindle assemblies consists of the spindle, the first bearing, and the second bearing.

11. The power transfer apparatus of claim 1 wherein each of the channels defines a
    bore having a diameter greater than a spindle assembly diameter including diameters of the spindle and each of the bearings.

12. The power transfer apparatus of claim 11 wherein each of the plurality of planet spindle assemblies consists of the spindle, the first bearing, and the second bearing.

* * * * *